US008133462B2

(12) United States Patent
Jouanneau et al.

(10) Patent No.: US 8,133,462 B2
(45) Date of Patent: Mar. 13, 2012

(54) METHOD OF MODIFYING A LITHIUM-BASED OXIDE COMPRISING AT LEAST ONE TRANSITION METAL, POSITIVE ELECTRODE COMPRISING THIS OXIDE, AND LITHIUM SECONDARY BATTERY

(75) Inventors: Séverine Jouanneau, St Quentin sur Isere (FR); Frédéric Le Cras, Notre Dame de L'Osier (FR); Carole Bourbon, St. Michel de St. Geoirs (FR)

(73) Assignee: Commissariat a l'Energie Atomique, Paris (FR)

( * ) Notice: Subject to any disclaimer, the term of this patent is extended or adjusted under 35 U.S.C. 154(b) by 723 days.

(21) Appl. No.: 11/883,829

(22) PCT Filed: Feb. 10, 2006

(86) PCT No.: PCT/FR2006/050120
§ 371 (c)(1),
(2), (4) Date: Aug. 7, 2007

(87) PCT Pub. No.: WO2006/085036
PCT Pub. Date: Aug. 17, 2006

(65) Prior Publication Data
US 2008/0113267 A1 May 15, 2008

(30) Foreign Application Priority Data
Feb. 11, 2005 (FR) .................................. 05 50406

(51) Int. Cl.
*C01B 25/12* (2006.01)
*H01M 4/139* (2010.01)

(52) U.S. Cl. ...... 423/305; 429/223; 429/224; 429/231.3
(58) Field of Classification Search .................. 429/223, 429/224, 231.1, 231.2, 231.3; 423/304, 305; 427/215
See application file for complete search history.

(56) References Cited

U.S. PATENT DOCUMENTS

| | | | | |
|---|---|---|---|---|
| 6,913,855 | B2 * | 7/2005 | Stoker et al. | 423/306 X |
| 7,364,793 | B2 * | 4/2008 | Paulsen et al. | 429/231.1 X |
| 2004/0206938 | A1 | 10/2004 | Barker et al. | |
| 2005/0196674 | A1 * | 9/2005 | Chiga et al. | 429/231.1 |

FOREIGN PATENT DOCUMENTS

| | | |
|---|---|---|
| JP | 2003-308842 A | 10/2003 |
| JP | 2003-338321 | 11/2003 |

OTHER PUBLICATIONS

Y.K. Sun et al., "Surface structural change of ZnO-coated LiNi$_{0.5}$Mn$_{1.5}$O$_4$ spinel as 5V cathode materials at elevated temperatures," Electrochimica Acta 48 (2003), pp. 503-506.
Ali Eftekhari, "Improving Cyclability of 5V Cathodes by Electrochemical Surface Modification," Chemistry Letters, vol. 33, No. 5, 2004, pp. 616-617.

* cited by examiner

*Primary Examiner* — Stephen J. Kalafut
(74) *Attorney, Agent, or Firm* — McKenna Long & Aldridge LLP

(57) ABSTRACT

The present invention relates to a method of chemically modifying a lithium-based oxide comprising at least one transition metal, which comprises, in succession:
a step of bringing said oxide into contact with an aqueous solution comprising phosphate ions;
a step of separating said oxide from the aqueous solution; and
a step of drying said oxide.
Use of the modified lithium transition metal oxide as active positive electrode material for a lithium secondary battery.

11 Claims, 2 Drawing Sheets

METHOD OF MODIFYING A LITHIUM-BASED OXIDE COMPRISING AT LEAST ONE TRANSITION METAL, POSITIVE ELECTRODE COMPRISING THIS OXIDE, AND LITHIUM SECONDARY BATTERY

This application claims the benefit of French Application No. 05-50406, filed on Feb. 11, 2005 and International Application No. PCT/FR2006/050120 filed on Feb. 10, 2006, which are hereby incorporated by references as if fully set forth herein.

TECHNICAL FIELD

The present application relates to a method of chemically modifying a lithium-based oxide comprising at least one transition metal and lithium, which lithium-based oxide may advantageously be used as active electrode material, and more particularly as active positive electrode material for a lithium secondary battery.

The invention also relates to a positive electrode for a lithium secondary battery comprising such a material.

Finally, the invention relates to lithium secondary batteries comprising a positive electrode comprising such a material.

The general field of the invention is therefore that of lithium secondary batteries.

Lithium secondary batteries have been the subject of extensive developments owing to their good results obtained in terms of voltage, mass energy density and volume energy density compared with lead/acid secondary batteries or those of the nickel-cadmium (Ni—Cd) or nickel-metal hydride (Ni-MH) type.

Owing to these highly attractive characteristics, lithium secondary batteries are applicable in many fields, especially in supplying power for thin on-board systems, such as credit cards and smart labels, in supplying power for mobile telephones, or in supplying power for electric vehicles.

PRIOR ART

Lithium secondary batteries operate on the principle of insertion/deinsertion (or intercalation/deintercalation) of lithium on at least one electrode.

More precisely, at each charge or discharge of the battery, lithium in ionic form ($Li^+$) is exchanged between the positive and negative electrodes. The amount of energy exchanged at each charge or discharge (which is delivered by the battery on discharge or delivered to the battery on charge) is precisely proportional to the amount of lithium that it is possible to exchange during the electrochemical reaction.

The active positive electrode materials are generally lithium-based oxide ceramics, such as $LiCoO_2$, $LiNiO_2$ and $LiMn_2O_4$, or else more complex oxides, such as $LiNi_{0.5}Mn_{1.5}O_4$. The lithium insertion/deinsertion phenomenon in these materials takes place at operating potentials relative to metallic lithium of around 4 V or more. Within this potential range, oxidation of the organic electrolyte with which the active positive electrode material is in contact has been observed, this oxidation being greater the larger the area of contact between the material and the electrolyte. This oxidation phenomenon results in a limited lifetime of the secondary battery and in particular a reduction in the discharge capacity after the battery has undergone a certain number of charge/discharge cycles.

To limit this electrolyte oxidation phenomenon, two alternatives may be envisaged.

The first alternative may consist in reducing the specific surface area of the active material by increasing the size of the particles of said material. However, this alternative is not advantageous in so far as it may result in a reduction in the capacity delivered by the battery, especially for high applied current densities.

The second alternative may consist in minimizing direct contact between the particles of active material and the electrolyte, by providing a protective interface between said particles and the electrolyte.

Thus, in the article published in Electrochemica Acta 48, 503-506, (2003), it has been proposed to coat the particles of active positive electrode material, in this case $LiNi_{0.5}Mn_{1.5}O_4$, with ZnO nanoparticles. The authors of that article were able to demonstrate that a lithium secondary battery comprising the material thus modified retains its nominal capacity after 50 cycles, whereas the same, but unmodified, material loses 90% of its nominal capacity after only 30 cycles. However, although lessened, the oxidative degradation of the electrolyte remains.

The inventors were set the objective of obtaining a lithium secondary battery having a relative stable discharge capacity after a large number of charge/discharge cycles.

The inventors have discovered, surprisingly, that by applying a specific treatment to the active material of the positive electrode, secondary batteries incorporating the material thus treated are stable with respect to their discharge capacity as a function of the number of charge/discharge cycles.

The object of the invention is therefore to provide a method of chemically modifying a lithium-based oxide comprising at least one transition metal, which can be used as active positive electrode material, making it possible to obtain an oxide capable of limiting the oxidation of the electrolyte with which it is in contact.

SUMMARY OF THE INVENTION

This object is achieved by a method of chemically modifying a lithium-based oxide comprising at least one transition metal, which comprises, in succession:
  a step of bringing said oxide into contact with an aqueous solution comprising phosphate ions;
  a step of separating said oxide from the aqueous solution; and
  a step of drying said material.

The method of the invention is distinguished from the methods of the prior art by the fact that it consists of a chemical modification of the transition metal oxide and not a simple deposition on this oxide, as IT is the case in the prior art.

The method of the invention is simple to implement, in so far as it involves standard reactants (in this case, an aqueous solution comprising phosphate ions), and requires no heat treatment at very high temperature, as it is the case with the methods of the prior art.

Thus, the method of the invention therefore firstly comprises a first step in which a lithium-based oxide comprising at least one transition metal is brought into contact with an aqueous solution comprising phosphate ions.

It should be pointed out that the contacting step is advantageously carried out for an appropriate time, in order to allow the surface of the lithium-based oxide to be chemically modified.

Preferably, the contacting operation is carried out with stirring for a time that may range from 15 minutes to 4 weeks, preferably from 12 hours to 48 hours.

According to the invention, the aqueous solution comprising phosphate ions may be a lithium dihydrogenphosphate ($LiH_2PO_4$) solution or a diammonium hydrogenphosphate (($NH_4)_2HPO_4$) solution. The aqueous solution may have a phosphate ion concentration ranging from 0.025 to 1 mol/l, for example 0.1 mol/l.

This contacting step may be carried out with heating, for example heating at a temperature of up to 70° C.

The lithium-based oxide comprising at least one transition metal advantageously comprises nickel, manganese, iron, copper, chromium and/or cobalt and optionally one or more elements chosen from Na, Ca, Sr, K, Mg, Nb, Al, Zr, V, Zn, Si, Mo and Ti.

The oxides that can be used within the context of this method may be chosen in particular from $LiCoO_2$, $LiMn_2O_4$ and $LiNi_{0.5}Mn_{1.5}O_4$. One particularly advantageous oxide is $LiNi_{0.5}Mn_{1.5}O_4$.

Advantageously, they are in powder form, especially a powder advantageously having a particle size ranging from 5 to 10 microns and a specific surface area ranging from 1 to 2 $m^2/g$.

The oxides used in the contacting step may be commercially available, but they may also be prepared beforehand. The techniques for preparing such oxides are well known to those skilled in the art. Among known preparation techniques, mention may be made of the sol-gel technique as described in Electrochemica Acta 48, 503-506, (2003).

After this contacting step, the modified lithium-based oxide is separated from the aqueous solution comprising phosphate ions. This separation step may be carried out by any liquid/solid separation technique.

Among separation techniques that can be employed within the context of this method, filtration and centrifugation may be mentioned.

Once separated from the aqueous solution, the lithium-based oxide thus modified may be made to undergo one or more rinsing steps using water, preferably ultrapure water, and/or with an aliphatic alcohol, such as ethanol.

After the separation step and the optional rinsing step, the oxide undergoes a drying step, for example by placing the oxide in a drying oven at a temperature of 50 to 100° C., for example 60° C. Advantageously, the oxide finally undergoes, so as to complete the drying step, a heat treatment step at a temperature ranging from 100 to 500° C., for example 350° C., for a time ranging from 2 to 5 hours.

The invention also relates to the modified lithium-based oxide comprising at least one transition metal that can be obtained by the method described above.

Such a lithium-based oxide comprising at least one transition metal is distinguished from the compounds of the prior art by the fact that it includes $PO_4$ groups linked on the surface to the constituent metal atoms of the oxide. It therefore has a chemical composition that is surface-modified relative to the untreated lithium-based oxide.

The lithium-based oxide comprising at least one transition metal, once incorporated into a positive electrode material for a lithium secondary battery, protects the electrolyte, with which it is in contact, from oxidation and thus allows the battery to undergo a large number of charge/discharge cycles without appreciably reducing the discharge capacity.

As mentioned above, this oxide is intended most particularly for making up the positive electrode of a lithium secondary battery.

Thus, the invention relates to the use of a modified lithium-based oxide comprising at least one transition metal described above as active electrode material, more precisely as active positive electrode material.

The invention furthermore relates to an electrode comprising the lithium-based oxide as described above as active material.

The modified oxide may, according to the invention, be in the form of particles, preferably nanoparticles, dispersed in an electrically conducting matrix.

This electrically conducting matrix generally comprises an electrically conducting additive and an organic binder.

Among electrically conducting additives that can be used, mention may be made of carbon.

Among organic binders that can be used, mention may be made of organic polymers chosen from:
polyethers;
polyesters; and
polymers resulting from the polymerization of methyl methacrylate, acrylonitrile, vinylidene fluoride and mixtures thereof.

Finally, the invention relates to a lithium secondary battery having at least one cell comprising:
a positive electrode comprising a modified lithium-based oxide comprising at least one transition metal as defined above;
a negative electrode; and
a lithium-ion conducting electrolyte placed between said positive electrode and said negative electrode.

Conventionally, the negative electrode may for example be either a negative electrode comprising a carbon-based lithium insertion compound or a lithium-based metal oxide (in the case of batteries belonging to the lithium-ion system) or a negative electrode made of lithium or a lithium alloy, such as lithium alloyed with Sn, Si, Ge or Al (in the case of batteries belonging to the lithium-metal system).

In general, the electrolyte is in the form of a liquid electrolyte impregnating a porous material.

The liquid electrolyte generally includes a solvent chosen from the group consisting of carbonates, ethers and mixtures thereof, and a lithium salt dissolved in this solvent.

As examples of carbonates, mention may be made of ethylene carbonate, propylene carbonate, dimethylcarbonate and diethylcarbonate.

As examples of ethers, mention may be made of dimethoxyethane, dioxolane and dioxane.

As lithium salts, mention may be made of $LiPF_6$, $LiClO_4$, $LiBF_4$, $LiAsF_6$, $LiCF_3SO_3$, $LiN(CF_3SO_2)_3$ and $LiN(C_2F_5SO_2)$.

For the same number of charge/discharge cycles, lithium secondary batteries comprising a modified oxide according to the invention have a much lower loss of discharge capacity than batteries comprising an unmodified oxide. The lithium batteries according to the invention have a longer lifetime and consequently are economically more attractive.

Other features and advantages of the invention will become more clearly apparent on reading the following examples, given by way of non-limiting illustration and with reference to the appended drawings.

DETAILED DESCRIPTION OF PARTICULAR EMBODIMENTS

Figure 1:
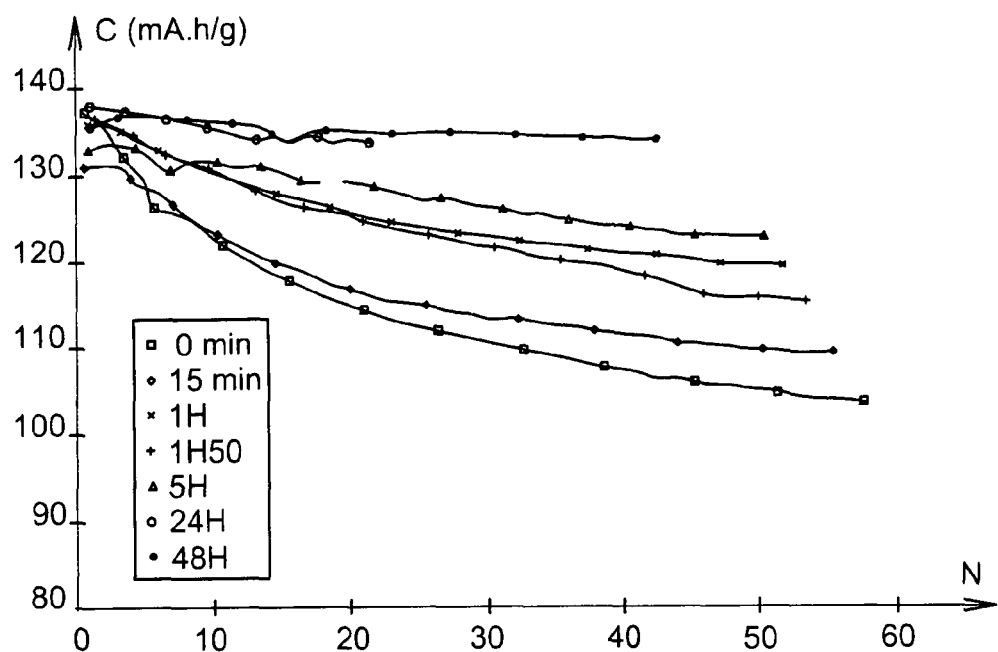
FIG. 1 is a graph showing the change in discharge capacity C (expressed in mA.h/g) as a function of the number of cycles N.

The following examples illustrate the chemical modification of a lithium-based oxide comprising at least one transition metal according to the method of the invention and use of the oxides thus modified in a lithium secondary battery as active positive electrode material.

EXAMPLE 1

$LiNi_{0.5}Mn_{1.5}O_4$ was prepared by intimately mixing lithium carbonate, nickel carbonate and manganese carbonate, mixed in stoichiometric proportions, followed by a heat treatment (10 hours at 900° C.) and slow cooling (1° C./min).

One gram of $LiNi_{0.5}Mn_{1.5}O_4$ prepared beforehand was immersed in 50 ml of a 0.1M aqueous $LiH_2PO_4$ solution and stirred for 48 hours at room temperature. After centrifugation and successive rinsings with water and then with ethanol, the oxide was dried at 60° C. over a weekend. Finally, a heat treatment at 350° C. was carried out for three hours.

EXAMPLE 2

One gram of $LiNi_{0.5}Mn_{1.5}O_4$ prepared beforehand at 900° C. was immersed in 50 ml of a 0.1M aqueous $(NH_4)_2HPO_4$ solution and stirred for 24 hours at room temperature. After centrifugation and successive rinsings with water and then with ethanol, the oxide was dried at 60° C. over a weekend. Finally, a heat treatment at 350° C. was carried out for three hours.

EXAMPLE 3

The modified lithium-based transition metal oxide prepared in Example 1 was incorporated into a lithium-metal secondary battery comprising:
- a negative electrode consisting of a lithium disc (diameter: 16 mm; thickness: 130 microns) deposited on a nickel disc serving as current collection;
- a positive electrode consisting of a 14 mm diameter disc taken from a composite film 50 microns in thickness comprising the oxide of the invention prepared as in Example 1 (80% by weight), carbon black (8% by weight) as conducting material, and polyvinylidene hexafluoride (12% by weight) as binder, the combination being deposited on an aluminium current collector (foil 25 microns in thickness); and
- a separator imbibed with the $LiPF_6$ liquid electrolyte as a 1M solution in propylene carbonate.

At 25° C., this battery delivered a capacity of 137 mAh/g, relatively stable under C/5 cycling conditions, as Example 7 below demonstrates.

EXAMPLE 4

The modified lithium-based transition metal oxide prepared in Example 2 was incorporated into a lithium-metal secondary battery comprising:
- a composite negative electrode comprising the active material $Li_4Ti_5O_{12}$ (80% by weight), carbon black (8% by weight) as electrically conducting material, and polyvinylidene hexafluoride (12% by weight) as organic binder, the combination being deposited on an aluminium current collector;
- a composite positive electrode comprising the oxide described in the invention, prepared as in Example 2, the other constituents being according to those described in Example 3; and
- a separator imbibed with liquid electrolyte consisting of $LiPF_6$ as a 1M solution in propylene carbonate. The performance characteristics were similar to those described in Example 3.

EXAMPLE 5

The purpose of this example was to demonstrate the change in discharge capacity as a function of the number of charge/discharge cycles undergone by lithium secondary batteries having a positive electrode based on $LiNi_{0.5}Mn_{1.5}O_4$ modified according to the method of the invention or unmodified.

To do this, firstly various modified oxides were prepared according to Example 1 by varying the time during which the oxides were in contact with the aqueous $LiH_2PO_4$ solution (15 minutes, 1 hour, 1 hour 50 minutes, 5 hours, 24 hours and 48 hours, respectively).

The oxides thus modified were each incorporated into a lithium battery in accordance with Example 3.

At the same time, a battery comprising an unmodified lithium transition metal oxide was also prepared using the same operating method as in Example 3.

Each secondary battery having a modified or unmodified oxide was subjected to a succession of charge/discharge cycles at the C/5 rate (charge and discharge in 5 hours). At the end of each cycle, the discharge capacity of the battery was measured. The results are given in FIG. 1.

It is clearly apparent from this figure that:
- a lithium battery having a modified oxide according to the invention experiences a smaller reduction in its discharge capacity as a function of the number of cycles than a battery having an unmodified oxide;
- the reduction in discharge capacity is smaller the longer the modified oxide incorporated into the battery has been in contact with an aqueous $LiH_2PO_4$ solution; and
- a battery having a modified oxide according to the invention (contact time with the aqueous $LiH_2PO_4$ solution of 48 hours) shows that the discharge capacity as a function of the number of cycles is virtually constant.

It may also be noted that the residence time of the $LiNi_{0.5}Mn_{1.5}O_4$ in $LiH_2PO_4$ does not in itself affect the nominal capacity (i.e. the initial capacity).

EXAMPLE 6

This example demonstrates the loss of discharge capacity per charge/discharge cycle for lithium secondary batteries comprising modified or unmodified $LiNi_{0.5}Mn_{1.5}O_4$.

To do this, various oxides modified according to the invention were firstly prepared as in Example 1 by varying the time during which the oxides were in contact with the aqueous $LiH_2PO_4$ solution (15 minutes, 1 hour, 5 hours, 24 hours and 48 hours, respectively).

The modified and unmodified oxides were each incorporated into a lithium battery according to the operating method of Example 3.

Each battery, having a given modified or unmodified oxide, was subjected to a succession of charge/discharge cycles at the C/5 rate. At the end of each cycle, the discharge capacity (in mA.h/g) was measured. The average loss of discharge capacity per cycle was then determined for each of the batteries.

Figure 2:
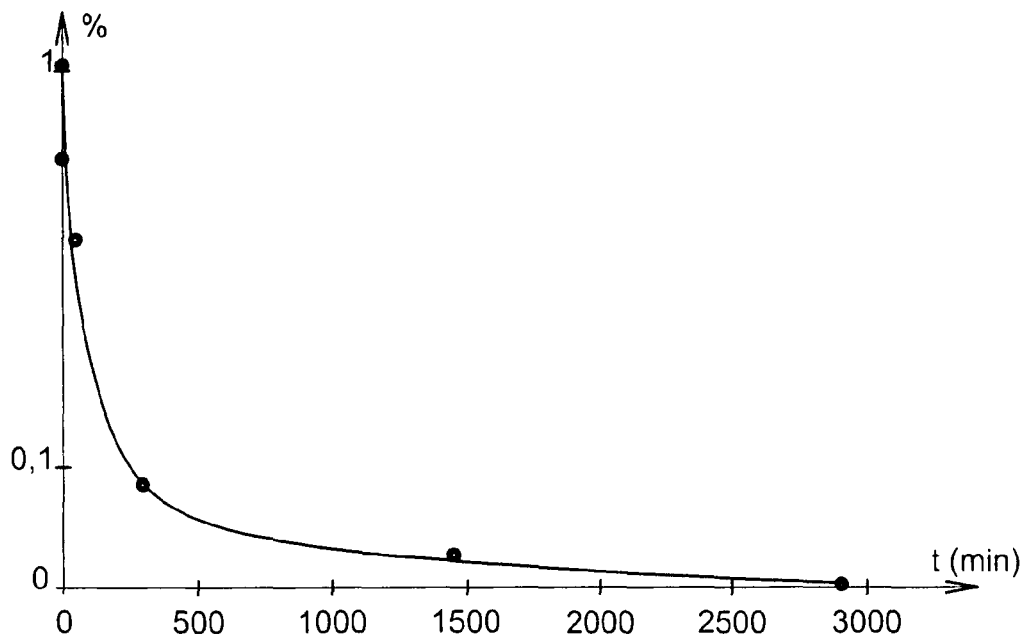
FIG. 2 is a graph showing the percentage loss of discharge capacity (on a logarithmic scale) per cycle (in %) as a function of the residence time t (in minutes) of an $LiNi_{0.5}Mn_{1.5}O_4$ oxide in an $LiH_2PO_4$ solution.

The results are given in FIG. 2.

This figure clearly shows that lithium batteries having a modified oxide according to the invention as active positive electrode material exhibit a smaller loss of discharge capacity per cycle than the lithium battery having an unmodified oxide as active positive electrode material.

More precisely, a lithium battery having an unmodified $LiNi_{0.5}Mn_{1.5}O_4$ exhibits an average loss of discharge capacity per cycle of the order of 1%, whereas a lithium battery having a modified $LiNi_{0.5}Mn_{1.5}O_4$ (contact time with $LiH_2PO_4$ of 300 minutes or longer) exhibits an average loss of discharge capacity per cycle of less than 0.1%.

EXAMPLE 7

This example determines the loss of discharge capacity per cycle for a battery of Example 3 (comprising $LiNi_{0.5}Mn_{1.5}O_4$ modified by being in contact with $LiH_2PO_4$ for a time of 48 hours).

To do this, the battery of Example 3 was subjected in succession to 90 charge/discharge cycles at the C/5 rate and the discharge capacity was measured at the end of each cycle.

Figure 3:
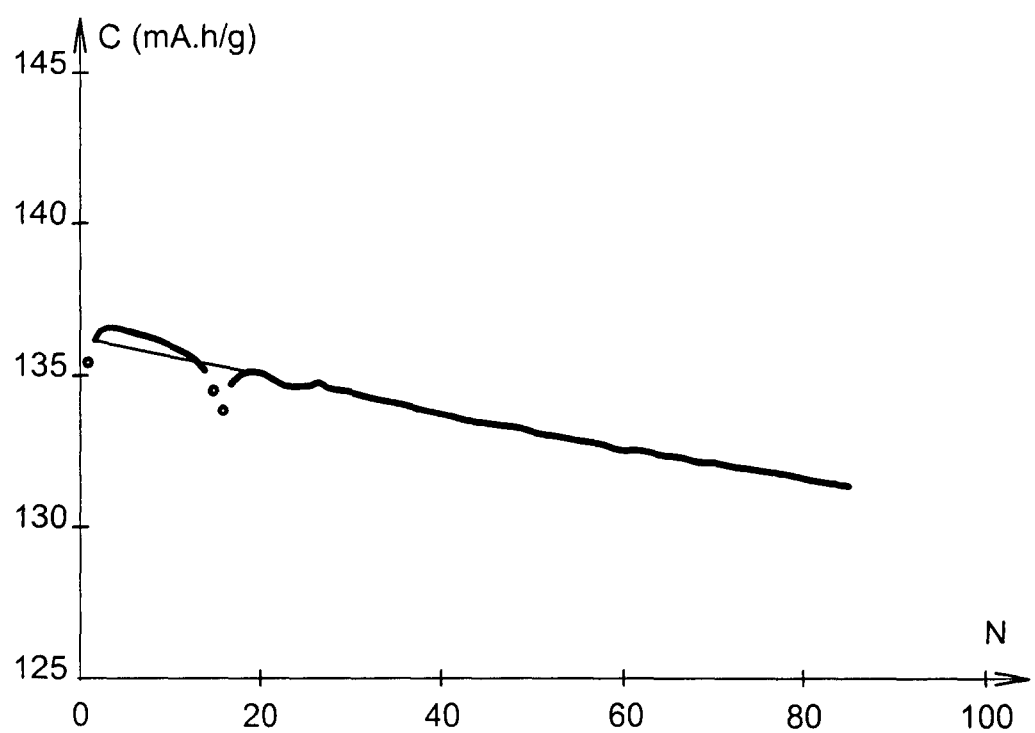
FIG. 3 is a graph showing the change in discharge capacity C (expressed in mA.h/g) as a function of the number of cycles N for an oxide that has remained in an $LiH_2PO_4$ solution for 48 hours.

The results are given in FIG. 3.

It may be seen from this figure that the discharge capacity decreases very slightly. Specifically, the loss of discharge capacity per cycle was on average 0.044%.

The invention claimed is:

1. Method of chemically modifying a lithium-based oxide comprising at least one transition metal which is in the form of a powder, which comprises, in succession:
    a step of bringing said oxide into contact with an aqueous solution comprising phosphate ions;
    a step of separating said oxide from the aqueous solution; and
    a step of drying said oxide,
    wherein the lithium-based oxide thus obtained includes —$PO_4$ groups linked to the transition metal atoms of the lithium-based oxide.

2. Method according to claim 1, in which the contacting step is carried out with stirring for a time that may range from 15 minutes to 4 weeks.

3. Method according to claim 1, in which the aqueous solution comprising phosphate ions is a lithium dihydrogenphosphate ($LiH_2PO_4$) solution or a diammonium hydrogenphosphate (($NH_4$)$_2HPO_4$) solution.

4. Method according to claim 1, in which the aqueous solution comprising phosphate ions has a phosphate ion concentration ranging from 0.025 to 1 mol/l.

5. Method according to claim 1, in which the lithium transition metal oxide comprises nickel, manganese, iron, copper, chromium and/or cobalt.

6. Method according to claim 5, in which the lithium transition metal oxide further includes one or more elements chosen from Na, Ca, Sr, K, Mg, Nb, Al, Zr, V, Zn, Si, Mo and Ti.

7. Method according to claim 1, in which the lithium transition metal oxide is chosen from $LiCoO_2$, $LiMn_2O_4$ and $LiNi_{0.5}Mn_{1.5}O_4$.

8. Method according to claim 1, in which the powder has a particle size ranging from 5 to 10 microns and a specific surface area ranging from 1 to 2 m$^2$/g.

9. Method according to claim 1, in which the separation step is carried out by centrifugation.

10. Method according to claim 1, in which the drying step is carried out in a drying oven at a temperature ranging from 50 to 100° C.

11. Method according to claim 1 further including a heat-treatment step at a temperature ranging from 100 to 500° C.

* * * * *